US008786870B2

(12) United States Patent
Takebe et al.

(10) Patent No.: US 8,786,870 B2
(45) Date of Patent: Jul. 22, 2014

(54) IMAGE-FORMING APPARATUS AND IMAGE-READING APPARATUS AND METHOD

(71) Applicant: Fuji Xerox Co., Ltd., Tokyo (JP)

(72) Inventors: Yoshifumi Takebe, Kanagawa (JP); Akira Ishii, Kanagawa (JP); Kiyotaka Tsuchibuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/748,261

(22) Filed: Jan. 23, 2013

(65) Prior Publication Data
US 2014/0022575 A1 Jan. 23, 2014

(30) Foreign Application Priority Data
Jul. 23, 2012 (JP) ................................ 2012-162847

(51) Int. Cl.
*G06F 15/00* (2006.01)
*G06F 3/12* (2006.01)
*G06K 1/00* (2006.01)

(52) U.S. Cl.
USPC ........................................ 358/1.13; 358/1.18

(58) Field of Classification Search
USPC .................. 358/1.1, 1.18, 1.13, 1.15, 1.9
See application file for complete search history.

(56) References Cited

U.S. PATENT DOCUMENTS 6,342,963 B1 * 1/2002 Yoshino ..................... 359/204.1
8,191,986 B2 * 6/2012 Takahashi et al. ............. 347/19
8,400,693 B2 * 3/2013 Uwatoko ..................... 358/504

FOREIGN PATENT DOCUMENTS

JP 07-037018 A 2/1995
JP 2006-020030 A 1/2006

* cited by examiner

*Primary Examiner* — Douglas Tran
(74) *Attorney, Agent, or Firm* — Sughrue Mion, PLLC (57) ABSTRACT

An image-forming apparatus forms a test image on a sheet being transported. The test image includes a defect detection image for image defect detection and a plurality of marks for detecting the angle of inclination of the test image on the sheet in a two-dimensional plane extending in a transport direction of the sheet and a width direction of the sheet crossing the transport direction. The plurality of marks are formed at positions remote from each other in a central region of the sheet in the width direction. The image-forming apparatus then reads the test image, detects the plurality of marks, calculates the angle of inclination of the test image based on the plurality of marks, corrects the test image for inclination based on the calculated angle of inclination, and detects an image defect based on corrected-image data representing the corrected test image.

10 Claims, 8 Drawing Sheets

IMAGE-FORMING APPARATUS AND IMAGE-READING APPARATUS AND METHOD

CROSS-REFERENCE TO RELATED APPLICATIONS

This application is based on and claims priority under 35 USC 119 from Japanese Patent Application No. 2012-162847 filed Jul. 23, 2012.

BACKGROUND

Technical Field

The present invention relates to image-forming apparatuses and image-reading apparatuses and methods.

SUMMARY

According to an aspect of the invention, there is provided an image-forming apparatus including an image-forming unit that forms an image on a sheet being transported and an image-reading unit that is disposed downstream of the image-forming unit in a transport direction of the sheet and that reads the image formed on the sheet being transported. The image-forming unit has a test mode in which a test image is formed on a sheet. The test image includes a defect detection image for image defect detection and a plurality of marks for detecting the angle of inclination of the test image on the sheet in a two-dimensional plane extending in the transport direction and a width direction of the sheet crossing the transport direction. The plurality of marks are formed at positions remote from each other in a central region of the sheet in the width direction. The image-reading unit reads the test image to acquire test image data representing the test image. The image-forming apparatus further includes a computing unit that performs an image defect detection operation based on the test image data. The computing unit includes a mark-detecting section that detects the plurality of marks; an inclination-calculating section that calculates the angle of inclination of the test image in the two-dimensional plane based on the plurality of marks detected by the mark-detecting section; an inclination-correcting section that corrects the test image for inclination based on the angle of inclination calculated by the inclination-calculating section to generate corrected-image data representing the corrected test image; and a defect-detecting section that detects an image defect based on the corrected-image data generated by the inclination-correcting section.

BRIEF DESCRIPTION OF THE DRAWINGS

An exemplary embodiment of the present invention will be described in detail based on the following figures, wherein.

DETAILED DESCRIPTION

An exemplary embodiment of the present invention will now be described.

Figure 1:
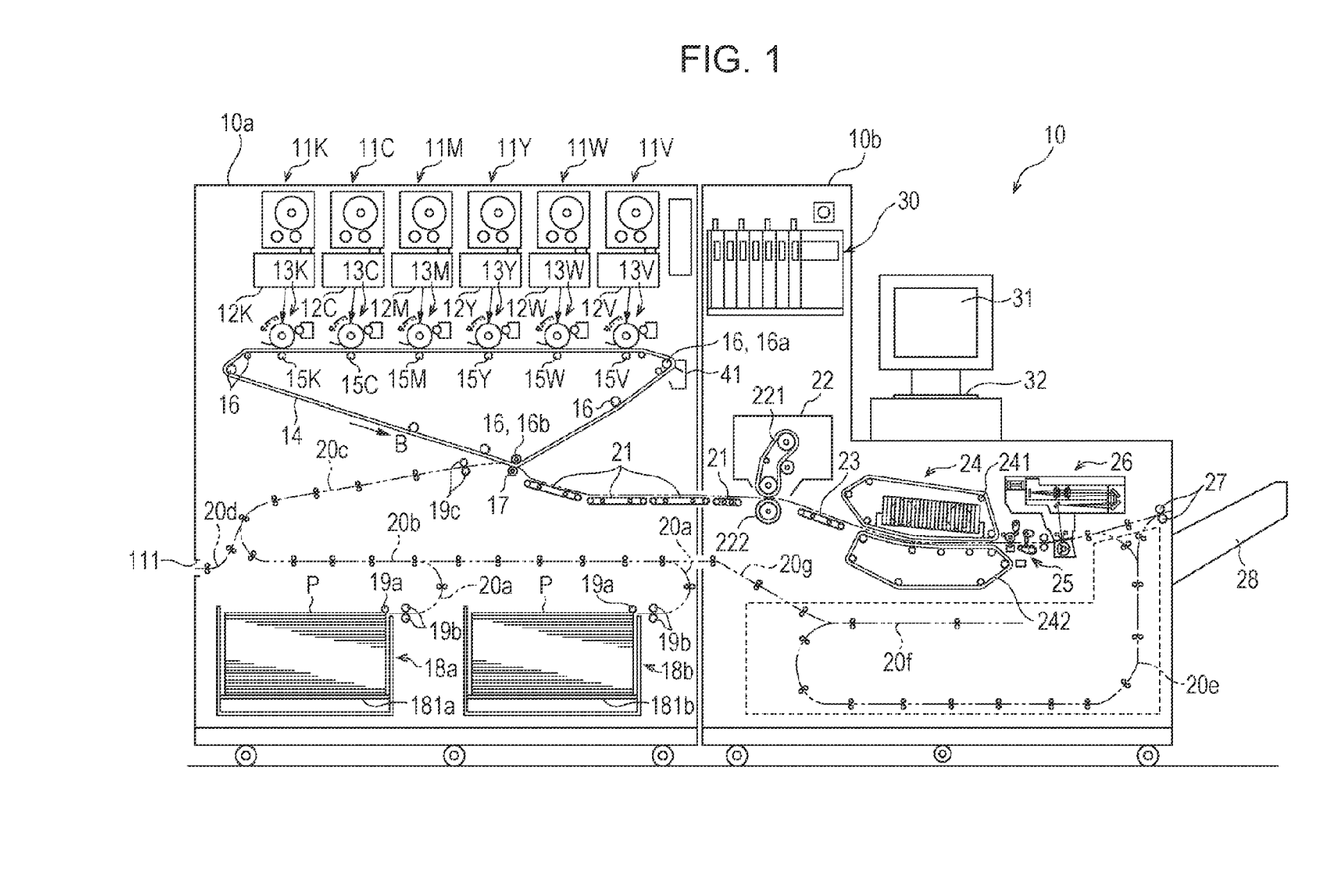
FIG. 1 is a sectional view of an image-forming apparatus according to an exemplary embodiment.

FIG. 1 is a sectional view of an image-forming apparatus according to an exemplary embodiment.

An image-forming apparatus 10 includes a first housing 10a and a second housing 10b that are coupled together. These two housings 10a and 10b accommodate various components of the image-forming apparatus 10.

The image-forming apparatus 10 is configured to form an image using up to six toners of different colors (including a transparent toner). Six toner cartridges 11V, 11W, 11Y, 11M, 11C, and 11K containing toners of different colors are arranged in the upper portion of the first housing 10a.

The alphabets in the references represent the following colors: V is a first special color (e.g., transparent), W is a second special color (e.g., light magenta), Y is yellow, M is magenta, C is cyan, and K is black. The toner cartridges 11V, 11W, 11Y, 11M, 11C, and 11K are simply indicated by 11 without using the alphabets representing the respective colors unless the colors need to be distinguished; they are indicated by the numeral followed by the alphabets representing the respective colors if the colors need to be distinguished. This also applies to the components other than the toner cartridges 11.

The toner cartridges 11 supply the toners to image-forming units 13, described later. The toner cartridges 11 are replaceable, and when they are empty, are replaced by fresh toner cartridges 11 containing toners of the same colors.

Disposed below the toner cartridges 11 in the first housing 10a are six exposure devices 12 and six image-forming units 13 corresponding to the six toner cartridges 11.

Figure 2:
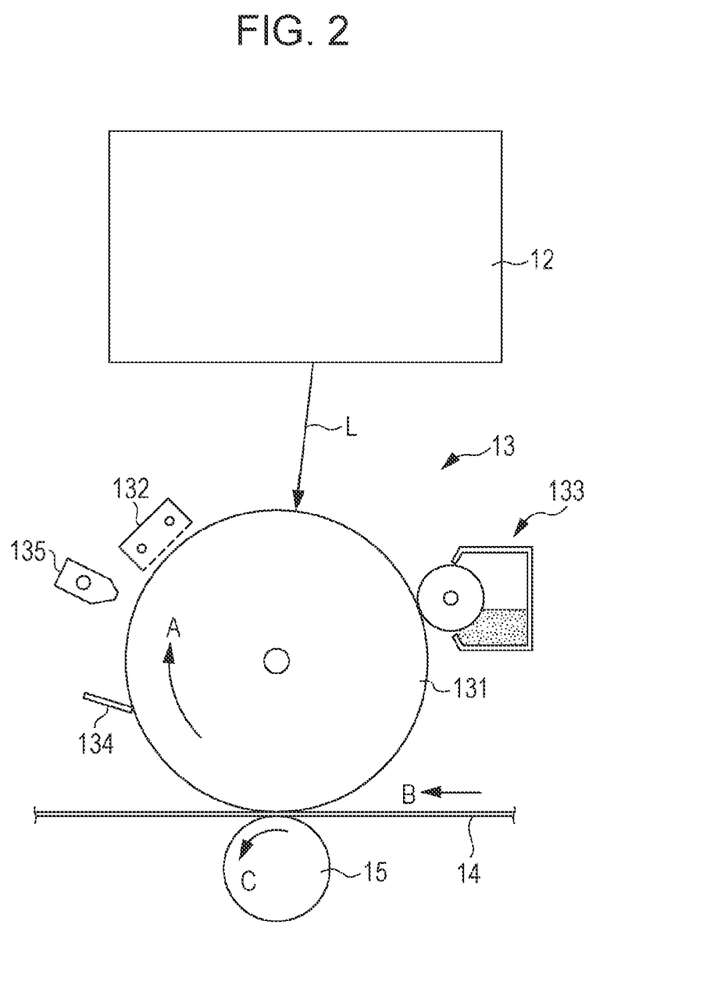
FIG. 2 is a sectional view showing an image-forming unit and the surrounding structure.

FIG. 2 is a sectional view showing one of the image-forming units 13 and the surrounding structure.

The image-forming unit 13 includes a drum-shaped photoreceptor 131 that rotates in the direction indicated by arrow A. The photoreceptor 131 is surrounded by a charging device 132, a developing device 133, a cleaning blade 134, and an erasing device 135. The exposure device 12 is disposed above the photoreceptor 131. A first transfer roller 15 is disposed opposite the photoreceptor 131 with an intermediate transfer belt 14, described later, therebetween.

As the photoreceptor 131 rotates in the direction indicated by arrow A, it is charged by the charging device 132 and is exposed to an exposure beam L modulated with image data by the exposure device 12. The exposure device 12 repeatedly scans the photoreceptor 131 with the exposure beam L in the direction perpendicular to the page in FIG. 2 to form an electrostatic latent image on the photoreceptor 131. The developing device 133, which contains a developer containing a toner and a carrier, develops the electrostatic latent image with the toner in the developer to form a toner image on the photoreceptor 131. The developing device 133 is supplied with the toner from the corresponding toner cartridge 11 (see FIG. 1) so that it contains a predetermined amount of toner. The toner image formed on the photoreceptor 131 by the developing device 133 is transferred to the intermediate transfer belt 14 by the first transfer roller 15, which rotates in the direction indicated by arrow C, as the intermediate transfer belt 14 is moved in the direction indicated by arrow B.

After transfer, the toner remaining on the photoreceptor 131 is scraped off and collected by the cleaning blade 134, and the latent image remaining on the photoreceptor 131 is erased by the erasing device 135. The photoreceptor 131 is then newly charged by the charging device 132.

Referring back to FIG. 1, the description is continued. The intermediate transfer belt 14 is an endless belt disposed below the six image-forming units 13. The intermediate transfer belt 14 is supported by rollers 16, including a drive roller 16a and a backup roller 16b. The intermediate transfer belt 14 is circulated in the direction indicated by arrow B in contact with the photoreceptors 131 of the image-forming units 13.

A second transfer roller 17 is disposed opposite the backup roller 16b with the intermediate transfer belt 14 therebetween. After the toner images are sequentially transferred to and superimposed on the intermediate transfer belt 14 by the first transfer rollers 15 corresponding to the respective image-forming units 13, they are further transported in the direction indicated by arrow B by the intermediate transfer belt 14. The toner images are then transferred from the intermediate transfer belt 14 to a sheet transported into the nip between the intermediate transfer belt 14 and the second transfer roller 17 by the second transfer roller 17. Thus, an unfixed toner image is formed on the sheet.

Two sheet containers 18a and 18b are disposed in the lower portion of the first housing 10a. The sheet containers 18a and 18b contain stacks of sheets P. The sheets P are picked up from the sheet containers 18a and 18b for image formation. The sheet containers 18a and 18b are configured such that bottom plates 181a and 181b are lifted as the sheet containers 18a and 18b contain fewer sheets P.

For image formation, a pickup roller 19a picks up the topmost sheet P from one of the sheet containers 18a and 18b, which is selected manually by the operator or automatically. If several sheets are picked up at the same time, one of the sheets is reliably separated by separating rollers 19b and is transported through transport paths 20a, 20b, and 20c by transport rollers 19 until the leading edge thereof reaches registration rollers 19c. The first housing 10a has an insertion hole 111 through which a sheet is inserted from outside the first housing 10a. A sheet inserted through the insertion hole 111 is transported through a transport path 20d and the transport path 20c until the leading edge thereof reaches the registration rollers 19c. The registration rollers 19c function to correct the position of the sheet being transported, to adjust the timing of feeding the sheet, and to feed the sheet downstream in the transport direction.

The registration rollers 19c feed the sheet so that it is transported to the second transfer roller 17 at the same timing when the toner images on the intermediate transfer belt 14 are transported to the second transfer roller 17.

The sheet having the toner image transferred thereto by the second transfer roller 17 is transported into the second housing 10b by transport belts 21 until the sheet reaches a fixing device 22. The fixing device 22 includes a heating belt 221 and a pressure roller 222. The sheet transported to the fixing device 22 is nipped between the heating belt 221 and the pressure roller 222, which heat and press the sheet to fix the toner image to the sheet. After passing through the fixing device 22, the sheet is cooled by a cooling device 24. The cooling device 24 cools the sheet between two endless belts 241 and 242. After exiting the cooling device 24, the sheet is decurled by a decurler 25. An optical measuring device 26 then performs measurements on the toner image fixed to the sheet. The optical measuring device 26 monitors, for example, whether an image has been correctly formed in normal image formation. The optical measuring device 26 also functions to perform measurements for various adjustments, including measurements on various charts, such as arrays of color patches, formed on sheets by the image-forming apparatus 10 for color tone correction, and measurements on images formed on sheets for adjustment of image position and magnification. Furthermore, the optical measuring device 26 performs measurements on images of uniform color and density formed on sheets to ensure that they have no scratches or density variations.

After passing through the optical measuring device 26, the sheet is ejected into a paper output tray 28 by paper output rollers 27.

After the second transfer of the toner image to the sheet by the second transfer roller 17, the intermediate transfer belt 14 continues to be moved in the direction indicated by arrow B and reaches a cleaner 41. The cleaner 41 removes the toner remaining on the intermediate transfer belt 14 from the intermediate transfer belt 14.

The above process is performed when an image is formed only on a first side of the sheet. The following process is performed when images are formed on both sides of the sheet. In this case, an image is formed on the first side of the sheet by the same process as above, and the sheet then passes through the optical measuring device 26. After passing through the optical measuring device 26, the sheet enters a transport path 20e before reaching the paper output rollers 27. The sheet is transported through the transport path 20e and enters a transport path 20f. When the sheet enters the transport path 20f, transport rollers forming the transport path 20f rotate in the reverse direction. The sheet is then fed in the reverse direction from the transport path 20f back into the first housing 10a and is transported through the transport paths 20b and 20c until it reaches the registration rollers 19c. At this time, the sheet has the second side thereof, which is blank, facing the intermediate transfer belt 14. While the sheet passes through the transport paths until it reaches the registration rollers 19c, toner images corresponding to the image to be formed on the second side of the sheet are formed by the image-forming units 13 and are transferred to the intermediate transfer belt 14. Subsequently, as in the formation of an image on the first side of the sheet, the sheet is fed from the registration rollers 19c, and the toner images are transferred to the second side of the sheet by the second transfer roller 17. The sheet then passes through the fixing device 22, the cooling device 24, the decurler 25, and the optical measuring device 26 and is ejected into the paper output tray 28 by the paper output rollers 27.

An image-processing unit 30 is disposed in the upper portion of the second housing 10b of the image-forming apparatus 10. The image-processing unit 30 includes, for example, a memory that stores image data received from outside the image-forming apparatus 10 and a computing circuit that processes the image data. The image-processing unit 30 also stores image data representing various test chart images that the image-forming apparatus 10 forms, for example, for color tone correction or image position correction.

A monitor 31 and an operating panel 32 are disposed on a lowered portion of the second housing 10b. The monitor 31 displays various statuses of the image-forming apparatus 10. The operating panel 32 accepts operations from the operator.

Figure 3:
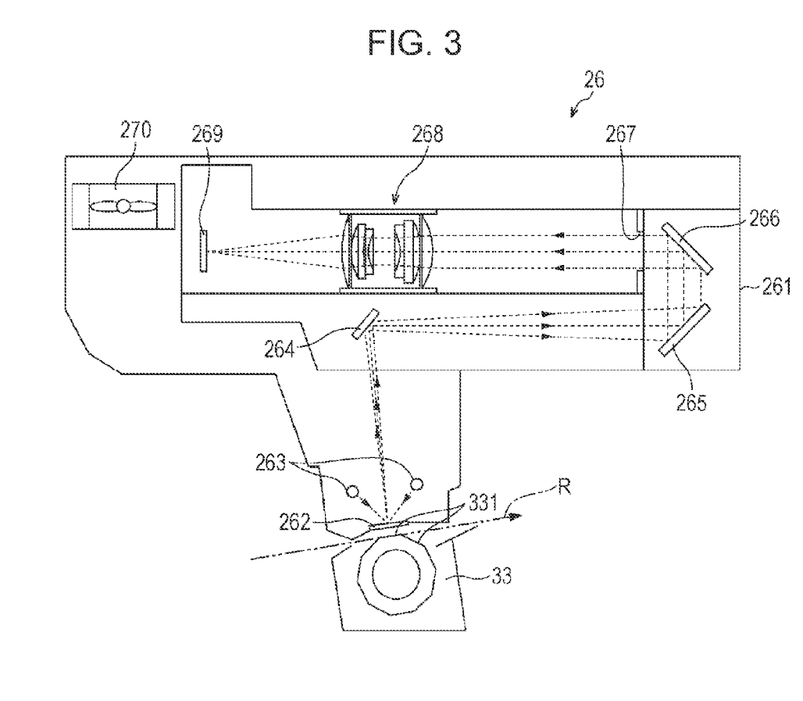
FIG. 3 is a sectional view of an optical measuring device shown in FIG. 1.
Figure 4:
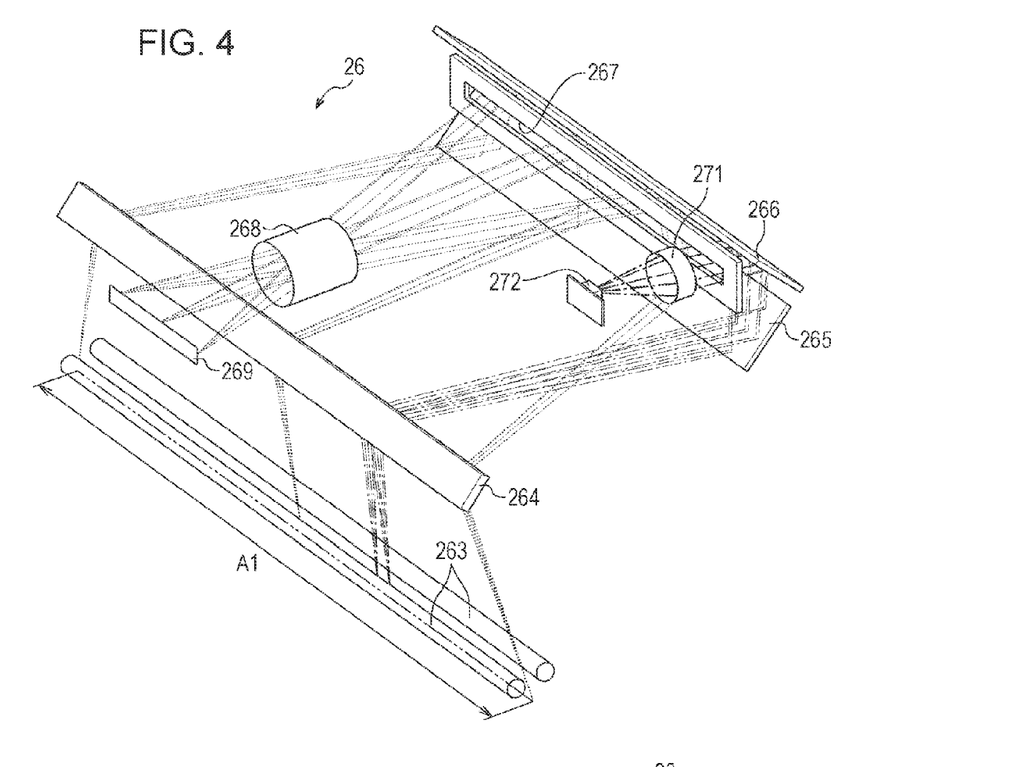
FIG. 4 is a schematic perspective view of an optical system of the optical measuring device shown in the sectional view of FIG. 3.
Figure 5:
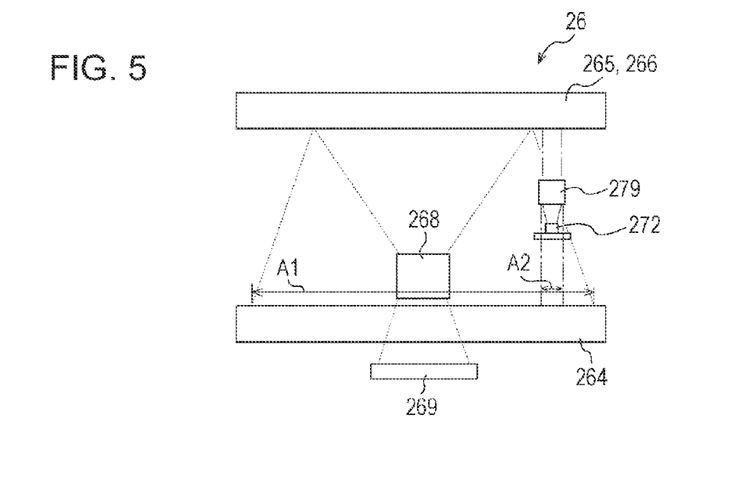
FIG. 5 is a plan view of the optical system of the optical measuring device as viewed from above.

FIG. 3 is a sectional view of the optical measuring device 26 shown in FIG. 1. FIG. 4 is a schematic perspective view of an optical system of the optical measuring device 26 shown in the sectional view of FIG. 3. FIG. 5 is a plan view of the optical system of the optical measuring device 26 as viewed from above.

As shown in FIG. 3, the optical measuring device 26 includes a housing 261 disposed above a sheet passage R through which the sheet passes. The housing 261 has an opening directly above the sheet passage R, with a piece of transparent glass 262 fitted therein. The opening and the transparent glass 262 fitted therein have an elongated shape longer than the full width of a sheet passing through the sheet passage R in the direction perpendicular to the page in FIG. 3. The housing 261 accommodates two lamps 263 disposed diagonally above the transparent glass 262. These two lamps 263 have an elongated shape longer than the full width of the sheet passing through the sheet passage R. Light emitted from the two lamps 263 passes through the transparent glass 262 and diagonally illuminates the sheet passing through the sheet passage R.

The light reflected upward by the sheet passing through the sheet passage R passes through the transparent glass 262, is reflected by a mirror 264, is reflected by two mirrors 265 and 266, passes through an opening 267 for blocking stray light, and is focused on a line sensor 269 by a lens 268. The line sensor 269 is an array of photodetectors arranged in the direction perpendicular to the page in FIG. 3. With these photodetectors, as shown in FIGS. 4 and 5, the field of view of the line sensor 269 covers a region A1 extending one-dimensionally in the width direction of the sheet. The photodetectors read the image on the sheet line by line in the width direction. As the sheet passes through the sheet passage R, the line sensor 269 repeatedly reads the image at intervals of, for example, 1 msec. Accordingly, the line sensor 269 reads the image on the sheet at a pitch of, for example, 0.1 mm to generate image data representing the entire image. The housing 261 also accommodates a fan 270 for air cooling of the lamps 263. To reduce the influence of heat generated by the lamps 263 on optical components such as mirrors and lenses, the housing 261 is partitioned into a room accommodating the lamps 263 and the fan 270 and a room accommodating the optical components, and only the light reflected by the sheet passes through the partition.

A prism-shaped reference plate unit 33 is disposed below the sheet passage R. The reference plate unit 33 has faces 331 that function as, for example, a reference white plate used as a reference of white and reference color plates used as references of various colors. The reference plate unit 33 is rotatable such that each face 331 faces the sheet passage R. When there is no sheet in the sheet passage R, the optical measuring device 26 reads the reference plates for brightness correction, correction of shading due to, for example, uneven illumination by the lamps 263, and correction of various colors.

As shown in FIGS. 4 and 5, the optical measuring device 26 also includes a lens 271 and a spectrometer 272. The lens 271 and the spectrometer 272 are positioned not to block light rays reflected by the sheet or the reference plates as they travel toward the line sensor 269. The spectrometer 272 receives the light reflected by the sheet passing over the reference plate unit 33 shown in FIG. 3, as does the line sensor 269, although it has a narrower field of view than the line sensor 269, i.e., a region A2 shown in FIG. 5, which is only a portion of the sheet passing therethrough. The region A2 is a region where color patches formed on the sheet pass during the passage of the sheet. The spectrometer 272 is a sensor that separates the light reflected by the color patches, which are formed on the sheet in order to correct the color tone of images to the desired color tone, and that measures the spectral reflection characteristics of the color patches.

As described above, the optical measuring device 26 is used for various applications, including measurements for color tone correction, measurements for correction of image position and magnification on a sheet, measurements for image defect detection, and various types of monitoring in normal image formation. Among such applications, the description below will focus on formation, reading, and processing of an image for image defect detection as a feature of this exemplary embodiment.

Figure 6:
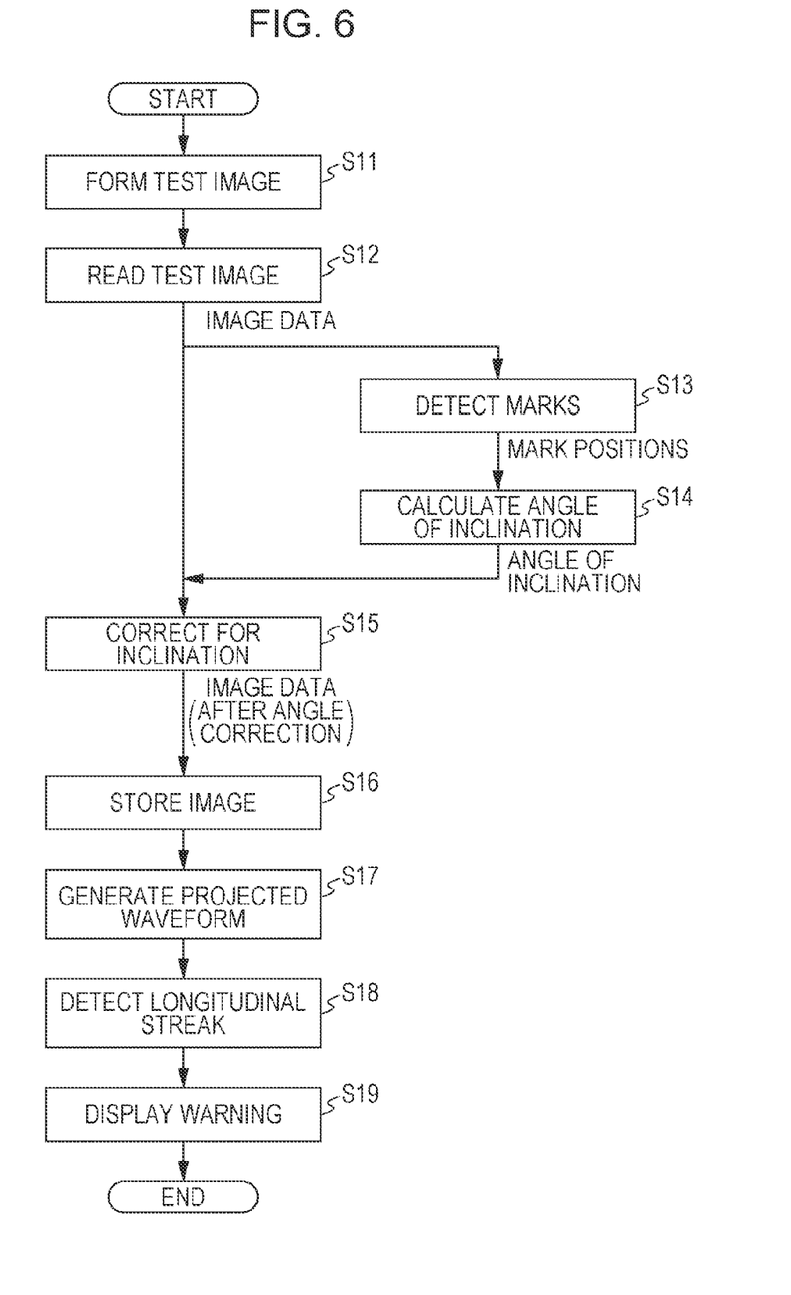
FIG. 6 is a flowchart of the operation of the image-forming apparatus during image defect detection.

FIG. 6 is a flowchart of the operation of the image-forming apparatus during image defect detection.

When the operator operates the operating panel 32 shown in FIG. 1 to initiate an image defect detection mode, a test image is formed on a sheet based on test image data representing a test image for image defect detection stored in the image-processing unit 30 (step S11).

Figure 7:
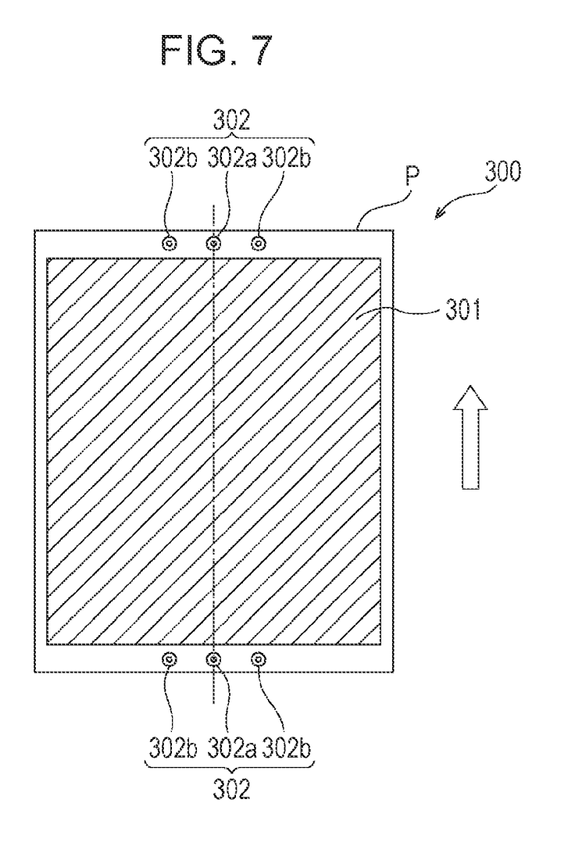
FIG. 7 illustrates an example of a test image.

FIG. 7 illustrates an example of a test image. This test image is generated for each color using one of the six image-forming units 13 shown in FIG. 1. In FIG. 7, the arrow indicates the transport direction of a sheet P, and the one-dot chain line indicates the centerline of the sheet P in the width direction. A test image 300 formed on the sheet P includes a defect detection image 301 for image defect detection and marks 302 for detecting the angle of inclination of the test image on the sheet P in a two-dimensional plane extending in the transport direction and the width direction. In this exemplary embodiment, the defect detection image 301 is an image of uniform density suitable for detection of longitudinal streaks (streak pattern extending in the transport direction) in an image and is formed over a wide area on the sheet P. If the sheet P passes through the optical measuring device 26 in an inclined position when it reads the test image, the marks 302 are used to detect the angle of inclination thereof for image correction.

The marks 302 are formed at positions remote from each other, i.e., near the leading and trailing edges of the sheet P in the transport direction, in the central region of the sheet P in the width direction. Specifically, in this exemplary embodiment, the marks 302 include first marks 302a and second marks 302b. The first marks 302a are formed in the center of the sheet P in the width direction (on the one-dot chain line in FIG. 7) near the leading and trailing edges of the sheet P in the transport direction. The second marks 302b are formed on both sides of each of the first marks 302a in the width direction near the leading and trailing edges of the sheet P.

Because the marks 302 for inclination detection are formed in the central region of the sheet P in the width direction, the optical measuring device 26 may be prevented from erroneously detecting that the sheet P is inclined in the plane when, for example, the sheet P floats. Specifically, as shown in FIG. 5, the light rays reflected at the ends of the sheet P in the width direction travel toward the line sensor 269 through inclined optical paths extending toward the center of the sheet P in the width direction (in the lateral direction in FIG. 5). If the sheet P floats during passage, therefore, it is read as a magnified image by the line sensor 269. For example, if the leading edge of the sheet P floats by a height of about 2 mm during passage, with the floating height of the trailing edge being 0 mm, the optical measuring device 26 detects that the edges of the sheet P on both sides in the width direction are inclined at an angle of 0.2°. Thus, if marks are formed at the corners of a sheet in the width direction and are used as a reference for inclination detection, an error due to floating adds to the original inclination. In this exemplary embodiment, such an error may be reduced because the marks 302 are formed in the central region of the sheet P in the width direction and are used as a reference.

After the test image shown in FIG. 7, which includes the defect detection image 301 and the marks 302, is formed on the sheet P (step S11 in FIG. 6) and is read by the line sensor 269 to generate test image data (step S12), the marks 302 are detected based on the test image data (step S13).

Figure 8:
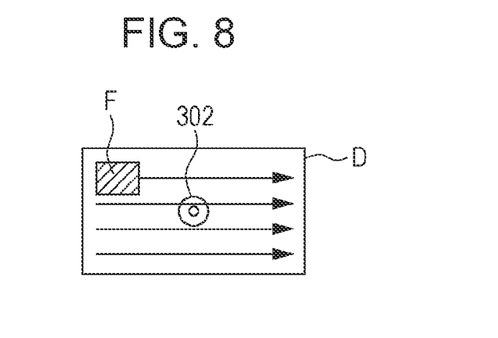
FIG. 8 illustrates a method for detecting marks based on test image data.

FIG. 8 illustrates a method for detecting the marks 302 based on the test image data. Although FIG. 7 shows a total of six marks 302, only one mark 302 is illustrated as a typical example because any mark is detected in the same manner.

A region D is defined around the mark 302. The region D is a region within which the mark 302 in the test image data should lie even if, for example, the sheet P passes through the optical measuring device 26 in an inclined position when it reads the test image. The region D is raster-scanned with an image filter F.

Figure 9:
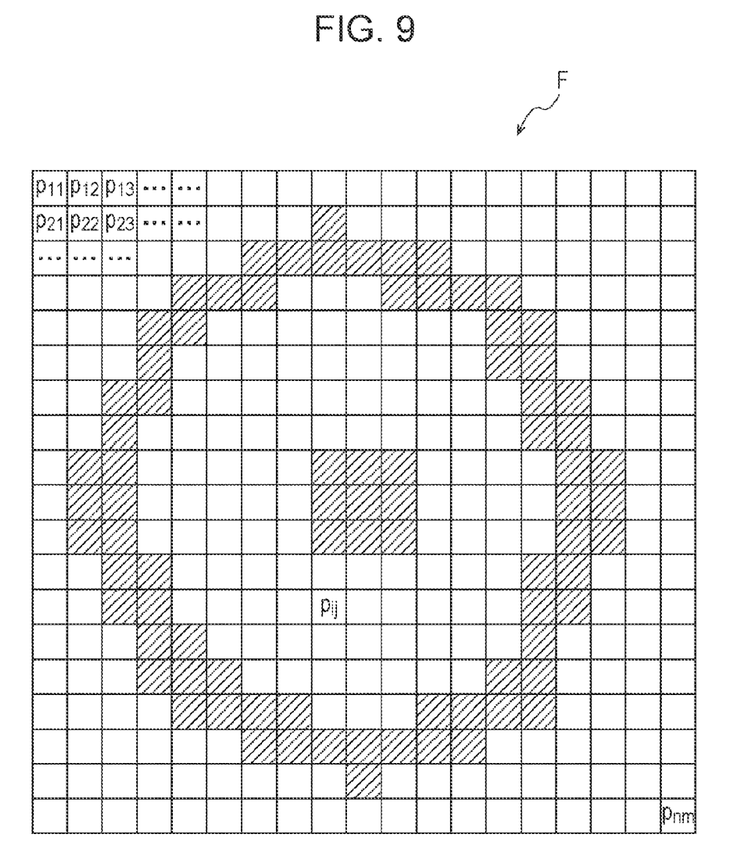
FIG. 9 illustrates an example of an image filter.

FIG. 9 illustrates an example of an image filter.

The image filter F is a two-dimensional array of pixels having values $p_{11}, p_{12}, \ldots, p_{21}, p_{22}, \ldots, p_{ij}, \ldots, p_{nm}$. The pixels of the image filter F correspond to the pixels in a region of equal size of the test image captured by the line sensor 269. The hatched area of the image filter F has the same dimensions as the mark 302 in the test image. The image filter F is superimposed on a certain region of the test image. For example, the values of the pixels in the region of the test image on which the image filter F is superimposed are represented by $q_{ij}$, and the following equation is computed:

$$Q = \sum_i \sum_j p_{ij} \cdot q_{ij} \quad (1)$$

The values $p_{ij}$ of the pixels of the image filter F are defined such that computing equation (1) gives a high value Q if the image filter F is superimposed on the test image so that the hatched area of the image filter F matches the mark 302 in the test image and gives a low value Q if the image filter F is superimposed on the test image so that the hatched area of the image filter F does not match the mark 302 in the test image.

Referring back to FIG. 8, the description is continued.

For example, the image filter F illustrated in FIG. 9 is superimposed on a subregion at the upper left corner of the region D, and the value Q obtained by computing equation (1) is associated with the central pixel of that subregion. The image filter F is then superimposed on a subregion shifted by one pixel in the horizontal direction, and the value Q obtained again by computing equation (1) is associated with the central pixel of the current subregion. This process is repeated until computing is completed for one line. The image filter F is then returned to the left end in the horizontal direction and is superimposed on a subregion shifted by one pixel in the vertical direction, and equation (1) is computed. The image filter F is then superimposed on a subregion shifted by one pixel in the horizontal direction, and equation (1) is computed. This process is repeated to obtain the value Q for each pixel in the region D. A pixel having the highest value Q among pixels having values Q higher than a predetermined threshold is determined to be the center of the mark 302.

In this manner, the positions of the six marks 302 are detected in step S13 in FIG. 6. Based on the marks 302, the angle of inclination of the test image is calculated (step S14 in FIG. 6).

The angle of inclination is calculated using the two first marks 302a on the centerline, which is indicated by the one-dot chain line in FIG. 7. In the case of a failure to detect one of the two first marks 302a, e.g., the first mark 302a near the leading edge of the sheet P, for some reason, the position of the undetected first mark 302a is determined based on the two second marks 302b on both sides of the first mark 302a. Specifically, in this case, the midpoint of a line segment joining the two second marks 302b detected on both sides of the undetected first mark 302a is determined, and the undetected first mark 302a is assumed to lie at the midpoint.

In this manner, the two first marks 302a are detected or assumed. A straight line joining the two first marks 302a is then determined, and the angle of inclination of the straight line with respect to the theoretical transport direction is calculated.

In this manner, the angle of inclination of the test image based on the test image data is calculated in step S14 in FIG. 6. An inclination correction operation is then performed (step S15). The inclination correction operation rotates the test image based on the test image data so that the calculated angle of inclination is zero.

After the inclination correction operation, the test image data is temporarily stored in the memory (step S16), and a projected waveform is then generated (step S17). The projected waveform is a distribution of pixel values in the width direction generated by computing the total values of the pixels arranged in the transport direction (in the direction indicated by the one-dot chain line in FIG. 7) among the pixels forming the defect detection image 301 (see FIG. 7) in the test image represented by the test image data.

Figure 10A:
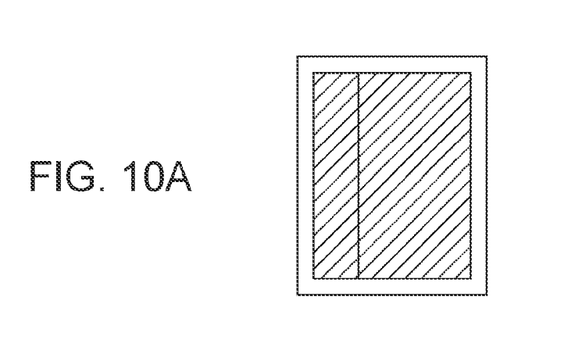
FIG. 10A illustrates a test image with a longitudinal streak.
Figure 10B:
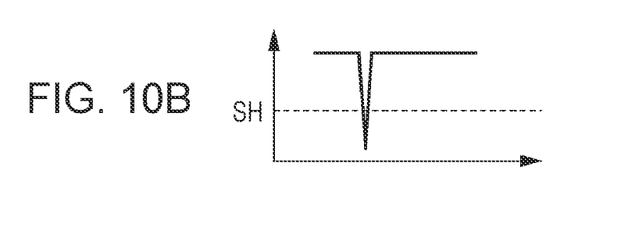
FIG. 10B illustrates a projected waveform thereof.

FIG. 10A illustrates a test image with a longitudinal streak, and FIG. 10B illustrates a projected waveform thereof.

FIG. 10A shows a test image after the inclination correction operation. As shown in FIG. 10B, the computed projected waveform thereof shows a large change in total pixel value due to a longitudinal streak. The projected waveform is compared to a preset threshold SH, and it is detected that the test image has a streak if the change exceeds the threshold SH (step S18 in FIG. 6). If a streak is detected, the monitor 31 shown in FIG. 1 displays a warning indicating the presence of a streak and information about the position of the streak in the width direction of the sheet (step S19 in FIG. 6). The fact that a longitudinal streak is detected indicates that there is some problem that causes a longitudinal streak in the image, for example, contamination or chipping of the cleaning blade 134 shown in FIG. 2, and maintenance such as component replacement or cleaning is performed.

Figure 11A:
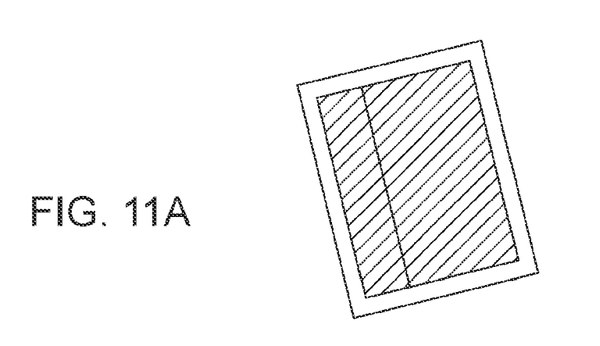
FIG. 11A illustrates a test image as a comparative example.
Figure 11B:
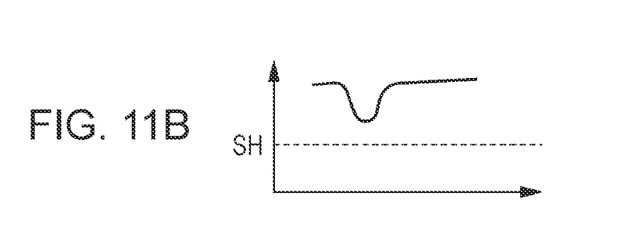
FIG. 11B illustrates a projected waveform thereof.

FIG. 11A illustrates a test image as a comparative example, and FIG. 11B illustrates a projected waveform thereof.

The test image shown in FIG. 11A is a test image based on test image data that is not corrected for inclination or that is not successfully corrected for inclination.

If a projected waveform is generated from the uncorrected test image, it shows a gradual change in total pixel value due to a longitudinal streak, as shown in FIG. 11B. Such a change might not be detected as a streak when compared to the threshold SH. If normal image formation is performed in this state despite the detection failure, the resulting image might have a visible longitudinal streak, which noticeably degrades the quality of the image.

In this exemplary embodiment, as described above, the angle of inclination may be accurately and reliably detected and corrected, and if the test image has a longitudinal streak, it may be reliably detected to prompt maintenance such as component replacement or cleaning.

Although the image-forming apparatus according to the above exemplary embodiment has the optical measuring device 26 disposed between the image-forming section and the sheet-ejecting section to read a test image using the optical measuring device 26, the present invention is not limited thereto. For example, the present invention may be applied to an image-forming apparatus that performs the above processing by ejecting a sheet having a test image formed thereon and reading the image on the ejected sheet using a scanner including a sheet feeder that feeds the sheet as the sheet is transported. Alternatively, image formation may be implemented by another image-forming apparatus, and the present invention may be applied to an image-reading apparatus having the function of the above type of scanner and a function that performs the same processing as above.

In addition, although the above exemplary embodiment illustrates an electrophotographic image-forming apparatus that performs development using toners, the present invention is not limited to any particular image-forming system. For example, the present invention may be applied to an inkjet image-forming apparatus having an array of nozzles arranged in the width direction of a sheet to detect a longitudinal streak in an image due to a defective nozzle.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-forming apparatus comprising:
    an image-forming unit that forms an image on a sheet being transported; and
    an image-reading unit that is disposed downstream of the image-forming unit in a transport direction of the sheet and that reads the image formed on the sheet being transported,
    wherein the image-forming unit has a test mode in which a test image is formed on a sheet, the test image including a defect detection image for image defect detection and a plurality of marks for detecting the angle of inclination of the test image on the sheet in a two-dimensional plane extending in the transport direction and a width direction of the sheet crossing the transport direction, the plurality of marks being formed at positions remote from each other in a central region of the sheet in the width direction, and
    wherein the image-reading unit reads the test image to acquire test image data representing the test image,
    the image-forming apparatus further comprising:
    a computing unit that performs an image defect detection operation based on the test image data, the computing unit including:
        a mark-detecting section that detects the plurality of marks;
        an inclination-calculating section that calculates the angle of inclination of the test image in the two-dimensional plane based on the plurality of marks detected by the mark-detecting section;
        an inclination-correcting section that corrects the test image for inclination based on the angle of inclination calculated by the inclination-calculating section to generate corrected-image data representing the corrected test image; and
        a defect-detecting section that detects an image defect based on the corrected-image data generated by the inclination-correcting section.

2. The image-forming apparatus according to claim 1, wherein the marks are formed near leading and trailing edges of the sheet in the transport direction in the central region of the sheet in the width direction by the image-forming unit in the test mode.

3. The image-forming apparatus according to claim 1,
    wherein the marks formed in the central region of the sheet in the width direction by the image-forming unit in the test mode include first marks formed in the center of the sheet in the width direction near leading and trailing edges of the sheet in the transport direction and second marks formed on both sides of each of the first marks in the width direction, and
    wherein the inclination-calculating section calculates the angle of inclination based on the first marks detected by the mark-detecting section and, if the mark-detecting section fails to detect at least one of the first marks, calculates the angle of inclination after determining the position of the undetected first mark from the second marks detected on both sides of the first mark in the width direction.

4. The image-forming apparatus according to claim 2,
    wherein the marks formed in the central region of the sheet in the width direction by the image-forming unit in the test mode include first marks formed in the center of the sheet in the width direction near the leading and trailing edges of the sheet in the transport direction and second marks formed on both sides of each of the first marks in the width direction, and
    wherein the inclination-calculating section calculates the angle of inclination based on the first marks detected by the mark-detecting section and, if the mark-detecting section fails to detect at least one of the first marks, calculates the angle of inclination after determining the position of the undetected first mark from the second marks detected on both sides of the first mark in the width direction.

5. The image-forming apparatus according to claim 1, wherein the defect-detecting section generates a cumulative value distribution in the width direction by calculating cumulative values of the pixels in the defect detection image forming the corrected test image represented by the corrected-image data in the transport direction and detects an image defect based on the cumulative value distribution.

6. The image-forming apparatus according to claim 2, wherein the defect-detecting section generates a cumulative value distribution in the width direction by calculating cumulative values of the pixels in the defect detection image forming the corrected test image represented by the corrected-image data in the transport direction and detects an image defect based on the cumulative value distribution.

7. The image-forming apparatus according to claim 3, wherein the defect-detecting section generates a cumulative value distribution in the width direction by calculating cumulative values of the pixels in the defect detection image forming the corrected test image represented by the corrected-image data in the transport direction and detects an image defect based on the cumulative value distribution.

8. The image-forming apparatus according to claim 4, wherein the defect-detecting section generates a cumulative value distribution in the width direction by calculating cumulative values of the pixels in the defect detection image forming the corrected test image represented by the corrected-image data in the transport direction and detects an image defect based on the cumulative value distribution.

9. An image-reading apparatus comprising:

an image-reading unit that reads an image formed on a sheet being transported, the image-reading unit reading a test image formed on a sheet to acquire test image data representing the test image, the test image including a defect detection image for image defect detection and a plurality of marks for detecting the angle of inclination of the test image on the sheet in a two-dimensional plane extending in a transport direction of the sheet and a width direction of the sheet crossing the transport direction, the plurality of marks being formed at positions remote from each other in a central region of the sheet in the width direction; and a computing unit that performs an image defect detection operation based on the test image data, the computing unit including:

a mark-detecting section that detects the plurality of marks;

an inclination-calculating section that calculates the angle of inclination of the test image in the two-dimensional plane based on the plurality of marks detected by the mark-detecting section;

an inclination-correcting section that corrects the test image for inclination based on the angle of inclination calculated by the inclination-calculating section to generate corrected-image data representing the corrected test image; and a defect-detecting section that detects an image defect based on the corrected-image data generated by the inclination-correcting section.

10. An image-reading method comprising:

reading a test image formed on a sheet to acquire test image data representing the test image, the test image including a defect detection image for image defect detection and a plurality of marks for detecting the angle of inclination of the test image on the sheet in a two-dimensional plane extending in a transport direction of the sheet and a width direction of the sheet crossing the transport direction, the plurality of marks being formed at positions remote from each other in a central region of the sheet in the width direction; and performing an image defect detection operation based on the test image data, the image defect detection operation including:

detecting the plurality of marks;

calculating the angle of inclination of the test image in the two-dimensional plane based on the plurality of detected marks;

correcting the test image for inclination based on the calculated angle of inclination to generate corrected-image data representing the corrected test image; and detecting an image defect based on the corrected-image data.

* * * * *